March 4, 1969  H. I. HENDERSON  3,430,659
PULSATION SUPPRESSOR
Filed Jan. 28, 1966

INVENTOR.
HOMER I. HENDERSON

Gregg & Stidham

BY ATTORNEYS

United States Patent Office 3,430,659
Patented Mar. 4, 1969

3,430,659
PULSATION SUPPRESSOR
Homer I. Henderson, 2220 Live Oak,
San Angelo, Tex. 76901
Filed Jan. 28, 1966, Ser. No. 523,733
U.S. Cl. 138—26  14 Claims
Int. Cl. F16l 55/04, 9/14, 55/02

This invention relates to pulsation suppressors useful to cushion or absorb shocks such as commonly occur in the transmission of liquids through pipe lines.

The suppression of pressure pulses in fluid piping has long been an aggravating engineering problem. When pumping into a pipe line with a pressure pump, each stroke of the piston causes a pressure surge to travel through the pipe system. This surge travels with the speed of sound in the fluid, with some modification due to pipe walls. Due to the fact that it obeys the law of physics for velocity of sound waves it is usually termed an acoustic wave. It has, however, one major difference from a sound wave: when a sound wave passes a point the pressure rises and falls with the passing of the wave, while with a pressure pulse the pressure rises (or falls) and remains high (or low) until relieved by expansion (or contraction) of pipes or fluid, or by fluid flow, or by a pressure wave of the opposite pressure phase. It is not unusual to have pressure surges of quite high pressure values, so high as to be destructive of pipes, running as high as many thousands of pounds per square inch. Almost everyone has experienced the sound similar to a hammer blow when they quickly closed a valve on a municipal water line. This hammer-like blow is caused by a pressure pulse generated by quickly stopping the water flow. It is customarily termed "water-hammer." The momentum of the checked flow of water generates a high pressure at the quickly closed valve, and this pulse travels at substantially the speed of sound, and it travels upstream. Not only is the noise from water-hammer objectionable, but the vibration generated tends to destroy pipe seals, and causes vibration fatigue. If the flowing velocity of the water was high, the water-hammer may generate sufficient pressure to rupture the pipes. According to Mark's Mechanical Engineer's Handbook (pages 3–80) the pressure generated in pounds per square inch is roughly sixty times the arrested velocity of the flowing water in feet per second.

Many types of suppressors have been built to reduce pressure surges. One is an upright gas chamber offset from the main flow line to cushion the pulse. This is effective to a degree, but the gas is soon absorbed into the liquid. An elastomer bladder has been used within the chamber to retain the gas and it has helped. However, the throat leading to the chamber is an inefficient component, and the pulse is only partially bled-off with the main energy travelling forward down the main flow line at the speed of sound. The bladder eventually fatigues and fails, but even when new the gas diffuses through the bladder, necessitating constant attention and frequent refilling.

Other attempts have used diffusion devices and pressure phase-shift devices within the main flow line. They, too, are effective to a degree, but they offer objectionable high flow resistance within the main line. Also, it is necessary to design these devices for a given velocity of flow within a given pipe size, having a fluid of given properties, thus limiting their usefulness if variation in rates of pumping or fluid characteristics is contemplated.

It is, therefore, an object of this invention to reduce the magnitude of the pressure pulse at its inception.

It is a further object of this invention to attenuate the generated pressure pulse within the main flow line and to do this without constricting the main flow line, and to accomplish this with a simple, trouble-free, low-cost device.

In carrying out this invention, I provide a chamber which opens into connection with a fluid transmission line. Preferably, the chamber is an extension of the fluid line itself, and, in its preferred form, comprises a pipe of enlarged diameter which is lined to approximately the normal pipe line internal diameter with cork or cork-like substance that has an extremely low modulus of bulk elasticity and which preferably has high sound and pressure wave absorbing or attenuating properties.

Other objects and advantages of this invention will become apparent from the description following when read in conjunction with the accompanying drawings wherein.

Figure 1:
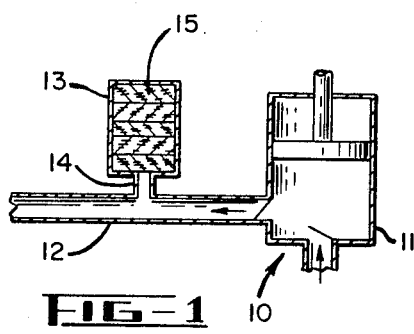
FIG. 1 is a schematic illustration showing my invention adapted to an offset pressure chamber.

Referring now to FIG. 1, there is shown a liquid transmission system 10, including a piston pump 11, and a pipe line 12. A suppressor chamber 13 is connected to pipe line 12 by means of a branch conduit 14, the suppressor chamber 13 being filled with cork 15. Cork is particularly suitable for use as the cushioning and shock-absorbing material of this invention in that it has a low bulk modulus of elasticity; it is an excellent sound suppressor; it is very resilient; it is chemically inert; and it has a low sound velocity. Moreover, it is readily available commercially and is low in cost. Other solid materials such as foamed plastics may have these characteristics to a greater or lesser degree and may, in some instances, be substituted. However, of materials presently known to me, cork is vastly superior for the purposes of this invention.

When water flow is suddenly stopped within a flow pipe, as by quickly closing a valve, a pressure pulse is generated. The magnitude of this pressure is given by Mark's Mechanical Engineer's Handbook, sixth ed., pp. 3–80, as:

$$P(\text{in p.s.f.}) = V \sqrt{\frac{w}{g} \frac{E \times E'}{E' + E\frac{d}{t}}}$$

where:
V is the velocity of liquid flowing (ft./sec.);
w is the weight of the liquid (lb./cu. ft.);
g is acceleration of gravity (ft./sec.$^2$);
E is bulk modulus of elasticity of the liquid (lb./ft.$^2$);
E' is Young's Modulus for pipe walls (lb./sq. ft.);
t is the pipe wall thickness in feet; and
d is the pipe diameter in feet.

The speed of travel of the pressure wave is given by the formula:

$$S(\text{in ft./sec.}) = \sqrt{\frac{g}{w} \frac{E \times E'}{E' + E\frac{d}{t}}}$$

However, due to the fact that E' is normally very much larger than E (in the case of water in a steel pipe, E' is 100 times greater than E) the pipe may be considered inelastic, and the formulae greatly simplified, as follows:

$$P = V\sqrt{E\frac{w}{g}} \text{ and } S = \sqrt{E\frac{g}{w}}$$

Thus, for a given fluid the pressure is proportional to the velocity, and for water in pipes under 6 inches in diameter this pressure may be assumed to be 60 p.s.i. per foot per second of extinguished velocity. The speed of pulse travel S is seen to be the same formula as for the speed of sound, and for water 4,700 ft./sec.

With each pressure stroke of the piston of pump 11, a pressure pulse is introduced into the flow line 12. A portion of this pressure pulse flows through the throat 14, into the chamber 13, compressing the cork 15. The strain energy stored in the cork 15 is many times that of water, and this energy is given back into the flow line 12 during the suction stroke of the piston. Thus it tends to absorb pressure pulses and to moderate pressure lows during the suction stroke. However, the off-set throat 14 is an inefficient transmitter of this high velocity pulse which travels in the main line 12 as a wave front at the speed of sound tending to by-pass the throat 14. For this reason, the chamber 13 might better be employed as a fluid storage vessel as, for example, in home-type water pumps. Hence, as water is pumped into the vessel, the cork compresses so that the entire space within the vessel is occupied by either water or cork with virtually no contaminants.

Figure 2:
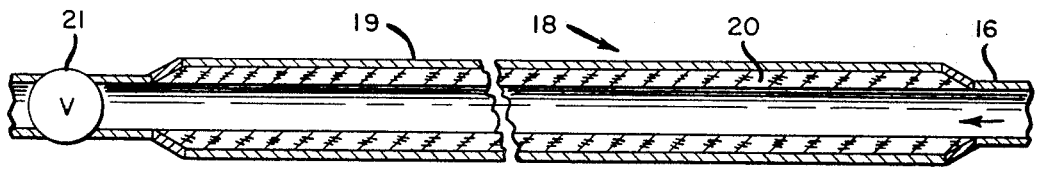
FIG. 2 is a view in cross-section of a preferred form of this invention.

Because of the inefficiency of the throat 14, and for other reasons, I prefer to use the form shown in FIG. 2. There, a fluid such as water may be flowing in a flow line 16, into which is connected a suppressor unit 18 comprising enlarged pipe walls 19 of steel or the like, which are lined with cork 20. The valve 21 controls the flow within the line 15. It will be seen that in this arrangement the absorbing material (cork) is in intimate contact with the flowing liquid, and this is highly desirable.

Bulk modulus of elasticity is a term to define the reciprocal of compressibility and the value of the modulus is the amount of pressure directed normal to the surfaces of the article, i.e. squeezing forces, which is required to produce a unit reduction in volume. Thus, the bulk modulus of elasticity E may be expressed by the following equation:

$$E = \frac{\text{stress}}{\text{strain}} = \frac{P_2 - P_1}{\frac{V_1 - V_2}{V_1}} = \frac{\Delta P}{\frac{\Delta V}{V_1}} = \frac{\Delta P V_1}{\Delta V}$$

where the subscripts 1 and 2 represent initial and final values for pressure and volume.

Again, assuming that the pipe is inelastic, the low bulk modulus characteristic of cork enables it to attenuate pulsations as will hereinafter be demonstrated.

Figure 5:
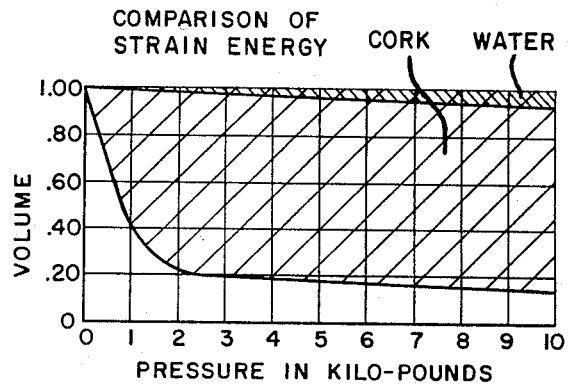
FIG. 5 is a graph showing the comparison of water to cork in regard to Strain Energy vs. Pressure.

Referring now to the chart (FIG. 5) which shows the comparison of the strain energy of cork and water, it will be noted that the volume change of water with increase of pressure follows a straight line and it is very slight over a wide range of pressure. In fact the bulk modulus of elasticity for water is constant: 300,000 p.s.i. Bulk modulus values of many liquids approximate that of water, but there is still a rather broad range of bulk moduli for liquids, such as 90,000 p.s.i. for ether, 160,000 p.s.i. for alcohol, and 4,000,000 p.s.i. for mercury. For purposes of illustration here, we will concern ourselves primarily with water as the fluid transmitted and cork as the pulsation suppressor.

From the chart the volume change undergone by a unit volume of cork at 1,000 p.s.i. is: 1.00 −.40 = .6 from which the bulk modulus for cork at that pressure may be calculated:

$$E_c = \frac{1000 \times 1 \text{ (unit vol.)}}{1.00 - .40} = \frac{1000}{.6} = 1665 \text{ p.s.i.}$$

Hence, the ratio of the moduli of water/cork is: 300,000/1,665 = 180/1 and their respective absorptions of strain energy will be in the same ratio. Thus, up to 1,000 p.s.i. pressure cork will absorb 180 times the strain energy of water. Fortunately, cork is highly resilient and gives all of this energy back to the system with falling pressure. A one inch cube of cork has been compressed under pressures as great as 14,000 p.s.i. without breaking the cells in its closed cellular structure, and after removal of the pressure the cube immediately returned to ninety percent of its original one inch height and showed no appreciable change in its length and breadth dimensions. Moreover, under ordinary conditions cork does not harden or deteriorate, and no matter how long it is held under pressure it will take only a minimum of permanent "set."

Again, assuming that the steel pipe is inelastic in the construction of FIG. 2, then the bulk modulus of a combination of water and cork is related to the combined change in volume of the cork plus the water:

$$E_{c+w} = \frac{\Delta P}{\frac{\Delta V_{c+w}}{V_1}} = \frac{\Delta P V_1}{\Delta V_{c+w}}$$

also:

$$E_{c+w} = \frac{1}{\frac{1}{\frac{E_c}{x}} + \frac{1}{\frac{E_w}{1-x}}}$$

where:
X = percent of cork by volume;
$E_{c+w}$ = the bulk modulus of elasticity of cork and water together;
$E_c$ = cork modulus
$E_w$ = water modulus Assuming, then, the total pressure to be under 1,000 p.s.i., with sufficient cork to make up 50% of the total volume, then:

$$E_{c+w} = \frac{1}{\frac{1}{\frac{1,665}{0.50}} + \frac{1}{\frac{300,000}{0.50}}} = 3,315 \text{ p.s.i}$$

$$\frac{\text{Bulk modulus water}}{\text{Bulk modulus cork} + \text{water}} = \frac{E_w}{E_{c+w}} = \frac{300,000}{3,315} = \frac{90.5}{1}$$

from this it can be shown that there is a big reduction in pulse pressure per foot/sec. of extinguished velocity. Thus, for water alone:

$$P = V\sqrt{\frac{w}{g}E_w} = 1\sqrt{\frac{62.4}{32.2} \times 300,000 \times 144} =$$

$$\sqrt{1.94 \times 43,200,000} = 9130 \frac{\text{lb.}}{\text{ft.}^2} =$$

63.4 p.s.i. per foot of extinguished velocity

And with 50% cork $$P_{c+w} = 1\sqrt{1.94}\sqrt{3315 \times 144} =$$

964 lb./ft.² = 6.7 p.s.i./ft. of velocity for the ratio of:

$$\frac{63.4}{6.7} = \frac{9.5}{1}$$

or only 10.5% as much pulse pressure with 50% cork and 50% water as with pure water. In the above computation only the water is moving, hence only its density is involved in the building-up of impact pressure "water-hammer" due to its momentum.

The velocity of travel of any wave generated in the construction of FIG. 2 will travel in the water at water's characteristic velocity for sound, in cork at its characteristic sound velocity, and in steel at steel's characteristic velocity. The velocity of sound in cork varies with specimens and with the degree of compression, but is roughly the velocity in air or 1,100 ft./sec. or about ⅕ the velocity of sound in water. Cork is a (closed-cell) cellular material with approximately 200 million of these minute cells per cu. in. and each cell is filled with air. Cork is 75% air by volume and the sound velocity is that of "loaded" air. This makes for an ideal sound absorber, and cork has frequently been used for the purpose.

Figure 6:
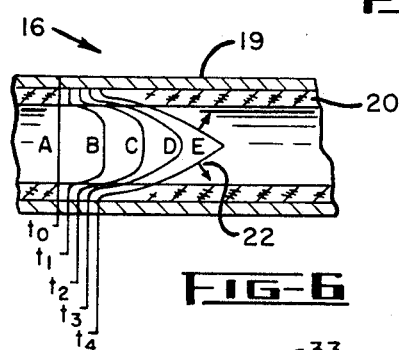
FIG. 6 is a sketch showing the attenuation of a pressure wave according to my invention.

FIG. 6 depicts the attenuation of a wave front in the absorber 16 when water is the flowing liquid and the internal diameter is moderate. Assuming that a wave front A is generated at the time $t_0$, at an interval of time later, $t_1$, the wave front has advanced to B in the water and only ⅕ of this amount in the cork. More important, the wave front in the water is dragged behind by the cork walls, as shown. At each succeeding time interval, $t_2$, $t_3$, $t_4$, etc., the wave front in the water becomes more and more peaked and conical until the wave has a substantial component travelling transversely as shown by the arrows 22. The transverse travelling component is quickly dissipated in the cork walls.

Figure 3:
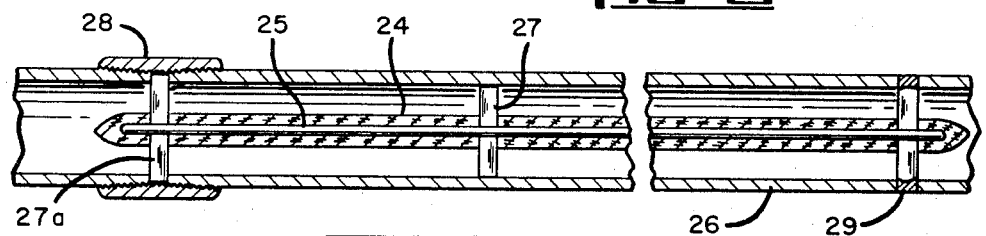
FIG. 3 is a view in cross-section of a modified form of this invention.

FIG. 3 shows a modified form of absorber adapted to be inserted into existing pipe lines. In this modification, the cork 24 is bonded to a central rod 25. The rod-cork assembly is inserted into the pipe 26 and is held concentric therein by the radial fins 27. The rod-cork assembly may be held in place by fins 27a extending into the coupling 28, as shown, or it may be secured by welding the fins 27 to the pipe 26 such as by plug welds 29.

Figure 4:
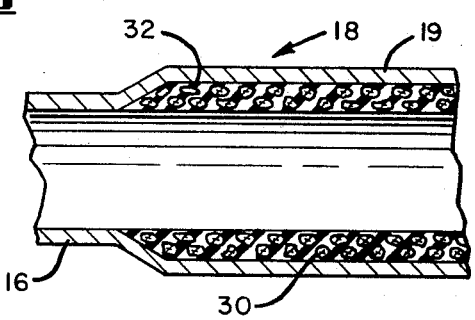
FIG. 4 is an enlarged cross-section view of one form of cushioning material.

FIG. 4 shows one method of bonding the cork to the pipe 19 wherein the cork particles 30 are bonded to the pipe 19 by an elastomer 32 such as rubber. The inner film of rubber presents a smooth, low-friction surface to reduce fluid friction. Since elastomers generally have high bulk moduli, some higher than that of water, the percent of rubber to cork can be varied to produce the desired degrees of rigidity, and/or total overall bulk moduli. It is noted that at zero pressure the section of the pipe 16 and absorber 18 present the same flow section to the fluid. With increase of pressure, the inside diameter of the absorber 18 increases as the cork particles 30 compress, further to reduce friction of flow. Other methods of bonding the cork can be used. One method much used in the cork industry is to use the innate resin within the cork itself as a bonding agent, upon the application of heat and low pressure.

Figure 7:
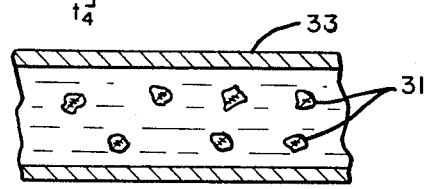
FIG. 7 shows a still further modification of the invention.

FIG. 7 shows still another modification wherein cork particles 31 are actually introduced into the liquid being pumped through the pipe 33 to act as bulk modulus reducers, hence pressure reducers. Cork is a very inert substance chemically, and it does not absorb liquids. Hence it can be circulated in many pumped liquids without adverse effects.

In this invention, the suppressor is placed very close to the component that causes the pressure waves, such as pump or valve. The pressure wave is greatly reduced at its inception because of the intimate contact of absorbing material and the liquid, and due to the low combined bulk modulus of cork and liquid. Due to cork's characteristic of high attenuation for pressure waves, the low magnitude pressure wave that is generated is quickly attenuated. This permits the accomplishment of its purpose with short sections of this suppressor. There may be extreme cases wherein it would be desirable to coat the inside of the complete length of pipe lines, but this can be done at low cost and without constriction of flow. Even a thin coating of cork will greatly reduce the effective bulk modulus when water or a liquid of similar or higher bulk modulus is the flowing liquid.

The length of the suppressor is dependent upon the characteristics of the fluid system as well as the source of the pressure wave. By way of example, support the system includes a 4 inch piston pump with a 5 inch stroke that is operated at 2 revolutions per second. This would produce the following:

$$\frac{\pi 4^2}{4} \times 5 = 62.9 \text{ cu. in./stroke}$$

or 126 cu. in./sec.

Now, if the pressure stroke takes 40% of a revolution, the average flow during the period required for the pressure stroke is:

$$.40 \times 62.9 = 25.16$$

Since the actual flow during period is 62.9 cu. in., we would like to absorb and store the excess, i.e. 62.9−25.2=37.3 cu. in., to flow back during the .3 sec. required for the suction stroke and piston end reversals.

Assuming the pressure to be under 1,000 p.s.i. wherein the bulk modulus for cork is 1,665 p.s.i. and using the formula:

$$E = PV_1/\Delta V \text{ or } V_1 VE/P$$

a pulse pressure ($\Delta P$) equal to zero would be ideal, but this would require an infinite volume of cork ($V_1$).

However, if a pulse pressure of 100 p.s.i. could be tolerated, then:

$$V_1 = \frac{37.7 \times 1,665}{100} = 628 \text{ cu. in.}$$

In the embodiment of FIG. 2 with an internal pipe diameter of 6 inches, this could be achieved with a cork sleeve 20, one inch thick and only 29 inches long. If a pulse pressure of only 10 p.s.i. was desired, the sleeve would be made just 25 feet long.

Similarly, in a 6 inch pipe line 1,000 feet long, the volume of water is:

$$\frac{\pi 6^2}{4} \times (1,000 \times 12) = 28.3 \times 12,000 = 340,000 \text{ cu. in.}$$

If the flowing velocity is 5 ft. per sec. and a valve is slammed shut the resultant $\Delta p$ is 300 p.s.i. (60 p.s.i.×feet per sec. of velocity). Hence the water compression is:

$$\Delta V_w = \frac{300 \times 340,000}{300,000} = 340 \text{ cu. in.}$$

If it is desired to restrict the pulse pressure to about 30 p.s.i., the change in volume of water will be just 10% as much or 34 cu. in. Enough cork must be supplied to absorb the difference, say 300 cu. in. of pulse compression. Hence:

$$V_{1c} = \frac{300 \times 1,665}{30} = 1,650 \text{ cu. ins.}$$

This can be accommodated in a cork sleeve two inches thick with an internal diameter of 6 inches (full flow) and only 28 feet in length.

Again this invention has been described primarily with cork as the pulsation absorbing medium, and of materials known to me, cork is preferred. However, some of the desirable characteristics of cork have been produced to some degree in certain foamed plastics, and preferably the semi-rigid foams. For example, urethane, vinyl, silicone, polyethylene and other plastics may be foamed into the necessary closed cell structure having flexible, impermeable membranes. Such material would, therefore, be satisfactory for purposes of this invention, particularly since one has greater control of a manufactured substance. For example, the cell size, the cellular pressure, and the membrane thickness can be controlled in accordance with the service for which the material is intended. Specifically, for low pressure use, a closed cell material with large cells, low cellular pressure and thin membranes would be preferred, while for high pressures one would choose small cells, high cellular pressure and thick membranes.

It is apparent that other modifications and changes may be made to this invention by those skilled in the art without departing from the spirit and scope of this invention as defined by the claims appended hereto.

Having described my invention, I claim:

1. In a liquid transmission system including a pulse generating device, a pulsation suppressor comprising:
 a housing,
 connector conduit means connecting said housing into said liquid transmission system,
 a resilient material formed of closed, fluid-tight cells enclosed by flexible cell walls and having a bulk modulus of elasticity of less than 20,000 p.s.i. at 1000 p.s.i. pressure, and
 means holding said material within said housing in continuous contact with liquid entering through said connector conduit means.

2. The combination with pulsation suppressor defined by claim 1 wherein:
 said housing is a pipe connected for direct communication in said liquid transmission system,
 opposite ends of said pipe forming inlet and outlet connector conduit means.

3. The combination with pulsation suppressor defined by claim 1 wherein:
 said material is cork.

4. The combination with pulsation suppressor defined by claim 1 wherein said housing is a pipe section and said holding means comprises:
 an elongated member secured within said pipe,
 means centering said elongated member approximately along the axis of said pipe, and
 means bonding said low bulk modulus particles onto said elongated member.

5. The combination with pulsation suppressor defined by claim 1 wherein:
 said housing is a pipe section of an internal diameter larger than the flow conduit diameter of said liquid transmission system,
 said connector conduit means are carried on opposite ends of said pipe and connect said pipe directly into said liquid transmission system,
 and including:
  means bonding said particles to the inner wall of said pipe.

6. The combination with pulsation suppressor defined by claim 1 wherein:
 said housing is a pipe section,
 opposite ends of said pipe section forming inlet and outlet connector conduit means,
 said pipe section is of an internal diameter larger than the flow conduit diameter of said liquid transmission system,
 said connector conduit means are carried on opposite ends of said pipe section and connect said pipe directly into said liquid transmission system as a continuation thereof, and
 said material is cork,
 and including:
  means bonding said cork particles to the inner wall of said pipe.

7. The combination with pulsation suppressor defined by claim 1 wherein:
 said housing is a pipe section connected directly into said liquid transmission system,
 opposite ends of said pipe forming inlet and outlet connector conduit means, and
 said material is cork,
 said holding means comprising:
  an elongated member secured within said pipe,
  means centering said elongated member approximately along the axis of said pipe, and
  means bonding said cord particles onto said elongated member.

8. The combination with pulsation suppressor defined by claim 1 wherein:
 said housing is a pipe connected directly into said liquid transmission system as a continuation thereof,
 opposite ends of said pipe forming inlet and outlet connector conduit means,
 said material is cork, and
 said holding means comprises:
  the fluid in said system holding said particles in suspension in said pipe.

9. The combination with pulsation suppressor defined by claim 1 wherein said material has high sound wave attenuating properties.

10. The combination with pulsation suppressor defined by claim 1 wherein said material has high pressure wave absorbing properties.

11. The combination with pulsation suppressor defined by claim 1 wherein:
 said connector conduit means comprises separate inlet and outlet flow passageways opening into said housing.

12. The combination with pulsation suppressor defined by claim 1 wherein:
 said housing is a pipe connected into said liquid transmission system as a continuation thereof, and located in proximity to said pulse generating device.

13. The combination defined by claim 1 including:
 an elastomer bonding agent securing said material within said housing.

14. For use in a liquid transmission system, a pulsation suppressor comprising:
 a length of pipe of an internal diameter larger than the flow conduit diameter of said liquid transmission system,
 connector conduit means on opposite ends of said pipe length for connecting said pipe length into a liquid transmission system,
 particles of a resilient material, namely cork, having a bulk modulus of elasticity of less than 100,000 p.s.i., and
 means holding said particles within said pipe length so as to be in continuous contact with liquid therein.

References Cited

UNITED STATES PATENTS

| | | | |
|---|---|---|---|
| 696,277 | 3/1902 | Sponseller et al. | 138—26 |
| 1,647,757 | 11/1927 | Storey | 138—26 |
| 2,342,904 | 2/1944 | Sledge | 138—26 |
| 2,495,693 | 1/1950 | Byrd et al. | 138—26 |
| 2,701,583 | 2/1955 | Rux | 138—26 |
| 2,755,820 | 7/1956 | Taylor | 138—26 |
| 2,808,070 | 10/1957 | Malsbary | 138—26 |
| 2,968,318 | 1/1961 | Bauman | 138—26 |
| 3,331,398 | 7/1967 | Goss | 138—26 |

FOREIGN PATENTS

| | | |
|---|---|---|
| 735,542 | 8/1932 | France. |
| 527,661 | 6/1931 | Germany. |

HOUSTON S. BELL, JR., *Primary Examiner.*

U.S. Cl. X.R.

138—141